No. 727,592. PATENTED MAY 12, 1903.
J. S. COPELAND.
BICYCLE.
APPLICATION FILED JULY 20, 1899.
NO MODEL.

Witnesses:
Frank G. Campbell
Emma P. Coffin

Inventor:
James S. Copeland.
by Jenkins & Barker
Attorneys.

No. 727,592.                                                     Patented May 12, 1903.

UNITED STATES PATENT OFFICE.

JAMES S. COPELAND, OF HARTFORD, CONNECTICUT, ASSIGNOR TO POPE MANUFACTURING COMPANY, OF PORTLAND, MAINE, A CORPORATION OF MAINE.

BICYCLE.

SPECIFICATION forming part of Letters Patent No. 727,592, dated May 12, 1903.

Application filed July 20, 1899. Serial No. 724,479. (No model.)

*To all whom it may concern:*

Be it known that I, JAMES S. COPELAND, a citizen of the United States, and a resident of Hartford, in the county of Hartford and State of Connecticut, have invented certain new and useful Improvements in Bicycles, of which the following is a full, clear, and exact description, whereby any one skilled in the art can make and use the same.

My invention relates more especially to the bearings for rotating parts of bicycles or other like vehicles; and the object of my invention is to provide a device of this class in which the adjustment of the several parts may be readily made and also in which the parts are so constructed as to be readily changed without disturbing the adjustment of the bearings. A device by means of which these objects may be attained is illustrated in the accompanying drawings, in which—

Figure 1:
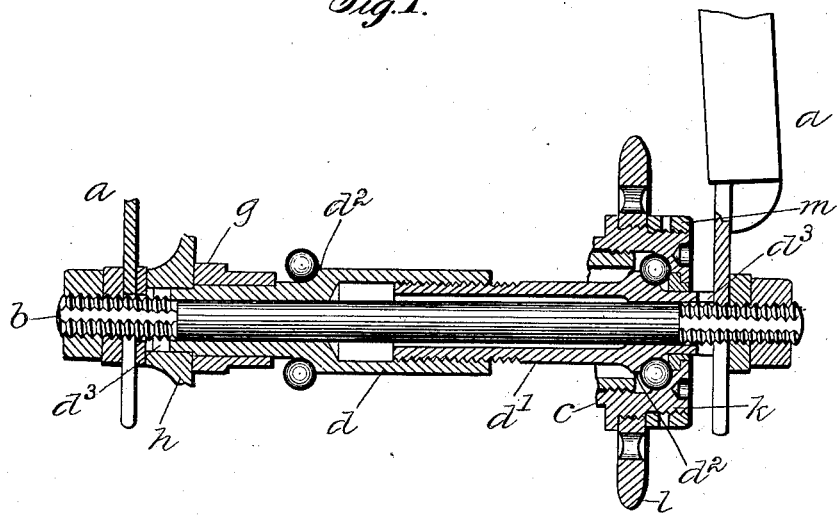
Figure 2:
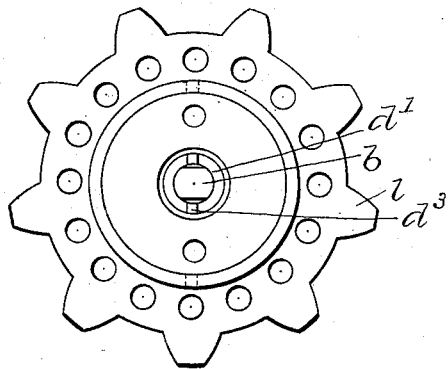
Figure 3:
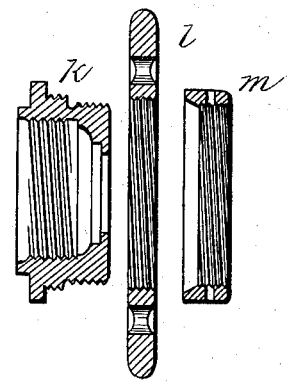

Figure 1 is a view in central horizontal section through a portion of the hub of the driving-wheel of a bicycle or like vehicle, showing my improvement. Fig. 2 is a detail view, in end elevation, showing the sprocket-wheel and its supporting parts. Fig. 3 is a detail view of separate parts, showing manner of attachment of the sprocket-wheel to the hub.

In the accompanying drawings the letter $a$ denotes members of the lower rear fork of a bicycle, $b$ a driving-wheel axle, and $c$ part of the hub of a driving-wheel supported thereon. The axle is secured to the fork sides in any ordinary manner and supports a sectional sleeve consisting of the sections $d$ $d'$, united by means of interengaging screw-threads. This sectional sleeve bears cones coöperating with ball-cases on a revolving part supported by the sleeve, these ball-bearings being adjusted by means of the relative lengthwise movement of the sleeve-sections with respect to each other.

The letter $g$ denotes the hub of a brake-actuating member, and $h$ a portion of the support for a band-brake and other parts appurtenant to the brake mechanism, the latter of which may be operated by hand or in any desired manner. The manner of mounting the wheel-hub for rotating it and for actuating the brake mechanism, however, forms no part of the present invention, except in connection with the sectional sleeve, and for this reason a further description of these parts and their operation is deemed unnecessary herein. The sections $d$ $d'$ of the sleeve are connected, preferably, between the cones $d^2$, located, in the form shown, near each end, and the sections are provided with suitable means $d^3$ for adjusting the sections with respect to each other. The means of adjusting shown herein consist of slots formed in the end of the sleeve-sections for the reception of a screw-driver. Any suitable means for locking the sections against relative movement may be used. In the form herein shown the parts are clamped between the fork sides $a$, a hub on the support $h$, mounted on a section of the sleeve and abutting against a shoulder thereon, extending to the fork side to said shoulder. A washer may be located between this hub and the fork side, if necessary, for the purpose of compensating for the adjustment. A mount $k$ for a sprocket-wheel $l$ is connected with the wheel-hub, being secured thereto as by means of interengaging screw-threads, the sprocket-wheel $l$ being preferably screwed to the mount and held in place, as by means of a lock-nut $m$. This forms a ready means for supplying a new sprocket-wheel when needed for any purpose, as to replace a broken part or for changing the gear, and at the same time avoid displacement of the adjustment of the bearings. It is obvious that these parts may be readily adapted for use of bevel-gears in connection with the driving mechanism simply by the aid of mechanical skill, and the driving-wheel may be thus arranged for use in connection with either a chain or gear driven vehicle.

It is to be noted that the means for adjusting the cones with respect to each other consists in the projections from the cones, in the ends of which projections the slots $d^3$ are located, these projections extending from the cones outwardly along the axle or support and beyond the ball-bearings to a point where they are readily accessible when the parts are assembled.

I claim as my invention—

1. In combination in a bicycle including a frame and driving mechanism, a support mounted in and secured to the frame, a non-rotatable sleeve surrounding said support and slidable thereon and consisting of two sections united by interengaging screw-threads and each having an outward-facing cone, and a rotating part mounted on said sleeve and having ball-bearings located on said cone and operatively connected with the driving mechanism.

2. In combination in a bicycle including a frame and driving mechanism, an axle mounted in and secured to the frame, a non-rotatable sleeve slidable on the axle and consisting of two sections united by interengaging screw-threads and each section having a cone located at a distance from its outer end, a rotating part supported on said sleeve and having its ends terminating short of the ends of said sleeve and operatively connected with the driving mechanism, and balls located between said sleeve and rotating part.

3. In combination in a bicycle including a frame and driving mechanism, a support mounted in and secured to the frame, a non-rotatable sleeve consisting of two sections bearing cones and united by interengaging screw-threads each section surrounding the support and slidable thereon, and a rotating part mounted on said sleeve and having ball-bearings located on said cone and operatively connected with the driving mechanism.

JAMES S. COPELAND.

Witnesses:
CHAS. L. BURDETT,
FELTON PARKER.